(12) United States Patent
Mori et al.

(10) Patent No.: US 12,173,382 B2
(45) Date of Patent: Dec. 24, 2024

(54) COMBUSTION ASH HANDLING METHOD AND SYSTEM, AND PETROLEUM-BASED FUEL COMBUSTION PLANT

(71) Applicant: KAWASAKI JUKOGYO KABUSHIKI KAISHA, Kobe (JP)

(72) Inventors: Hiroyuki Mori, Kobe (JP); Seiji Tabata, Kobe (JP); Suguru Yabara, Kobe (JP); Tomohiro Osawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 670 days.

(21) Appl. No.: 17/606,654

(22) PCT Filed: Apr. 24, 2020

(86) PCT No.: PCT/JP2020/017762
§ 371 (c)(1),
(2) Date: Oct. 26, 2021

(87) PCT Pub. No.: WO2020/218534
PCT Pub. Date: Oct. 29, 2020

(65) Prior Publication Data
US 2022/0298602 A1 Sep. 22, 2022

(30) Foreign Application Priority Data
Apr. 26, 2019 (JP) .................... 2019-086802

(51) Int. Cl.
| | | |
|---|---|---|
| C22B 34/22 | (2006.01) | |
| B03B 4/06 | (2006.01) | |
| B03B 9/04 | (2006.01) | |
| B09B 3/80 | (2022.01) | |
| B09B 101/30 | (2022.01) | |
| C01G 31/00 | (2006.01) | |
| F23G 5/02 | (2006.01) | |
| F23J 1/00 | (2006.01) | |
| F23J 15/02 | (2006.01) | |

(52) U.S. Cl.
CPC ............. *C22B 34/22* (2013.01); *B03B 4/06* (2013.01); *B03B 9/04* (2013.01); *B09B 3/80* (2022.01); *C01G 31/00* (2013.01); *F23G 5/02* (2013.01); *F23J 15/022* (2013.01); *B09B 2101/30* (2022.01); *F23G 2209/30* (2013.01); *F23J 1/00* (2013.01)

(58) Field of Classification Search
CPC .. C22B 34/22; B09B 3/80; B03B 4/06; B03B 9/04; F23G 5/02; F23G 2209/30; F23J 15/022; F23J 1/00
USPC .......................................................... 423/62
See application file for complete search history.

(56) References Cited

FOREIGN PATENT DOCUMENTS

| | | |
|---|---|---|
| JP | 54-101829 A | 8/1979 |
| JP | H60-161339 A | 8/1985 |
| JP | H10-314693 A | 12/1998 |

(Continued)

*Primary Examiner* — Anita Nassiri-Motlagh
(74) *Attorney, Agent, or Firm* — Oliff PLC

(57) ABSTRACT

A combustion ash handling method of handling combustion ash discharged from a combustion furnace that combusts a petroleum-based fuel includes: separating the combustion ash into a heavy component and a light component by a dry-type separation technique; feeding the light component to the combustion furnace as a fuel; and recovering the heavy component. A metal such as vanadium is separated and extracted from the heavy component of the combustion ash.

11 Claims, 4 Drawing Sheets

(56) References Cited

FOREIGN PATENT DOCUMENTS

| JP | 11-101423 A | 4/1999 |
|----|-------------|--------|
| JP | 2009-154093 A | 7/2009 |
| JP | 2017-140555 A | 8/2017 |

| | (a) FUEL PARTICLE | (b) COMBUSTION ASH PRODUCED FROM COMBUSTION OF FUEL | (c) COMBUSTION ASH PRODUCED FROM COMBUSTION OF COMBUSTION ASH |
|---|---|---|---|
| CROSS-SECTIONAL IMAGE | ◯ | ◎ | ◯ |
| DENSITY RATIO | — | 1 | 1< |
| PARTICLE DIAMETER RATIO | — | 1 | 1> |

FIG.2

COMBUSTION ASH HANDLING METHOD AND SYSTEM, AND PETROLEUM-BASED FUEL COMBUSTION PLANT

CROSS-REFERENCE TO RELATED APPLICATIONS

This application is a National Phase application of International Patent Application No. PCT/JP2020/017762, filed on Apr. 24, 2020, and claims priority to Japanese Patent Application No. 2019-086802 filed on Apr. 26, 2019, which are incorporated herein by reference in their entirety.

TECHNICAL FIELD

The present invention relates to a technique of handling petroleum-based combustion ash that is produced from at least one of fuel oil, heavy oil, or a petroleum residue.

BACKGROUND ART

Combustion ash that is produced from the combustion of fuel oil, heavy oil such as asphalt, and a petroleum residue such as petroleum pitch or petroleum coke (the combustion ash thus produced is hereinafter referred to as "petroleum-based combustion ash") contains uncombusted carbon, valuable metals such as vanadium, and ammonium sulfate. The fuel oil, heavy oil, and petroleum residue have a high nitrogen concentration and a high sulfur concentration due to concentration in petroleum refining, and waste gas that is produced when the fuel oil, heavy oil, and petroleum residue are combusted contains a large amount of NOx. The ammonium sulfate in the combustion ash is produced as a result of a reaction occurring between ammonia gas and sulfur oxides contained in the combustion waste gas. The ammonia gas is injected as a reductant into the combustion waste gas to denitrate the combustion waste gas.

Vanadium has been utilized not only as an additive agent added to special steel and as a raw material of a chemical product such as a catalyst, but also as, for example, a material of a functional alloy such as a Ti—V alloy and a material of a Ti—V-based hydrogen storage alloy used in a secondary battery. However, the price of vanadium (ferro-vanadium) has soared in recent years, and since the procurement of vanadium depends on importing, it is difficult to stably procure vanadium at an inexpensive price. Therefore, there is a demand for a technique that makes it possible to efficiently recover vanadium from petroleum-based combustion ash that is stably produced in a large amount.

As mentioned above, the petroleum-based combustion ash contains a large amount of uncombusted carbon in addition to valuable metals such as vanadium. For this reason, the petroleum-based combustion ash is bulky. Therefore, recovery treatment equipment for recovering vanadium from the petroleum-based combustion ash tends to be large-scale equipment. In this respect, Patent Literature 1 proposes a technique for reducing the scale of a vanadium separation and extraction process.

In a method disclosed in Patent Literature 1, fuel oil ash recovered by a dust collector on a boiler path is suspended in water to obtain a suspension, and the suspension is subjected to a wet process, by which a valuable metal and ammonium salt are eluted from the fuel oil ash and insoluble uncombusted carbon is separated from the suspension. Each of these is then subjected to a treatment, and thereby the valuable metal is recovered. Here, Patent Literature 1 proposes performing a pretreatment in advance, in which, in the suspension, a light component and a heavy component in the fuel oil ash are separated from each other by sedimentation utilizing a specific gravity difference, and thereby an upper suspension layer containing the light component and a lower suspension layer containing the heavy component are derived separately.

CITATION LIST

Patent Literature

PTL 1: Japanese Laid-Open Patent Application Publication No. 2009-154093

SUMMARY OF THE INVENTION

Technical Problem

In Patent Literature 1, the fuel oil ash suspension is treated in a sedimentation separation tank. Not only the fuel oil ash, but also a large amount of water flows into the sedimentation separation tank. For this reason, the sedimentation separation tank is required to have a large capacity. Moreover, although the uncombusted carbon contained in the combustion ash is reusable as a fuel, once the uncombusted carbon is mixed with water, immediate reuse of the uncombusted carbon as a fuel becomes difficult.

The present invention has been made in view of the above, and an object of the present invention is, in a technique of recovering metals such as vanadium from combustion ash of a combustion furnace that uses a petroleum-based fuel, to reduce the volume of the combustion ash efficiently and to reduce the scale of, and increase the efficiency of, a metal separation and extraction process.

Solution to Problem

A combustion ash handling method according to one aspect of the present invention is a method of handling combustion ash discharged from a combustion furnace that combusts a petroleum-based fuel. The combustion ash handling method includes: separating the combustion ash into a heavy component and a light component by a dry-type separation technique; feeding the light component to the combustion furnace as a fuel; and recovering the heavy component.

A combustion ash handling system according to one aspect of the present invention is a system for handling combustion ash discharged from a combustion furnace that combusts a petroleum-based fuel. The combustion ash handling system includes: a dry-type separator that separates the combustion ash into a heavy component and a light component; a light component transfer line that feeds the light component to the combustion furnace as a fuel; and a recovery container that recovers the heavy component.

A petroleum-based fuel combustion plant according to one aspect of the present invention includes: a combustion furnace that combusts a petroleum-based fuel; a dry-type dust collector that recovers combustion ash discharged from the combustion furnace; and the above-described combustion ash handling system, which handles the combustion ash.

In the above-described combustion ash handling method, combustion ash handling system, and petroleum-based fuel combustion plant, part of the combustion ash discharged from the combustion furnace is returned to the combustion furnace and used as a fuel. Accordingly, the combustion ash discharged from the combustion furnace contains combustion ash produced from the combustion of the fuel and combustion ash produced from the combustion of the combustion ash. The combustion ash produced from the combustion of the fuel contains a large amount of uncombusted carbon. Therefore, the combustion ash produced from the combustion of the fuel has a low specific gravity. On the other hand, the combustion ash produced from the combustion of the combustion ash contains less uncombusted carbon than the combustion ash produced from the combustion of the fuel, and heavy metals such as vanadium are concentrated in the combustion ash produced from the combustion of the combustion ash. Therefore, the combustion ash produced from the combustion of the combustion ash has a high specific gravity. Accordingly, in a case where the combustion ash is separated into a heavy component and a light component by dry-type separation, the heavy component contains a large amount of combustion ash produced from the combustion of the combustion ash, and the light component contains a large amount of combustion ash produced from the combustion of the fuel.

The light component of the combustion ash contains a large amount of uncombusted carbon, and is suitable to be used as a fuel in the combustion furnace, which makes it possible to efficiently utilize the energy of the combustion ash. In addition, since the light component of the combustion ash is separated by dry-type separation, the light component of the combustion ash can be directly utilized as a fuel in the combustion furnace as it is.

The volume of the heavy component of the combustion ash is less than the volume of the combustion ash discharged from the combustion furnace. Since the heavy component of the combustion ash has such a reduced volume, the recovery container, which recovers the heavy component, can be reduced in size. This makes it possible to reduce the space for storing the heavy component of the combustion ash, and thereby the storage efficiency can be increased. Moreover, space and energy for transferring the heavy component of the combustion ash can be reduced, and thereby the transferring efficiency can be increased. The heavy component of the combustion ash, which has such a reduced volume, is subjected to the subsequent process, in which the metal separation and extraction treatment is performed on the heavy component. Therefore, the scale of the equipment (e.g., a vanadium separation extractor) used in the metal separation and extraction process can be reduced. The amount of uncombusted carbon contained in the heavy component of the combustion ash is less than the amount of uncombusted carbon contained in the combustion ash discharged from the combustion furnace, and heavy metals such as vanadium are concentrated in the heavy component of the combustion ash. Therefore, high metal recovery efficiency can be realized in the metal separation extraction treatment.

Advantageous Effects of Invention

The present invention makes it possible, in a technique of recovering metals such as vanadium from combustion ash of a combustion furnace that uses a petroleum-based fuel, to reduce the volume of the combustion ash efficiently and to reduce the scale of, and increase the efficiency of, a metal separation and extraction process.

BRIEF DESCRIPTION OF DRAWINGS

FIG. 2 illustrates the characteristics of a fuel and combustion ash.

DESCRIPTION OF THE EMBODIMENTS

Hereinafter, the present invention is described based on an embodiment with reference to the accompanying drawings. The present invention relates to a technique of handling combustion ash that is discharged from a combustion furnace that uses, as a fuel, at least one of fuel oil, heavy oil such as asphalt, or a petroleum residue such as petroleum pitch or petroleum coke. More specifically, the present invention relates to a technique of recovering metals such as vanadium from the combustion ash. In the present embodiment, a description is given by taking a petroleum residue fired boiler 1 as one example of the combustion furnace. The present invention is also applicable to a petroleum-based fuel combustion plant 100 including a fuel oil fired boiler or a heavy oil fired boiler.

Figure 1:
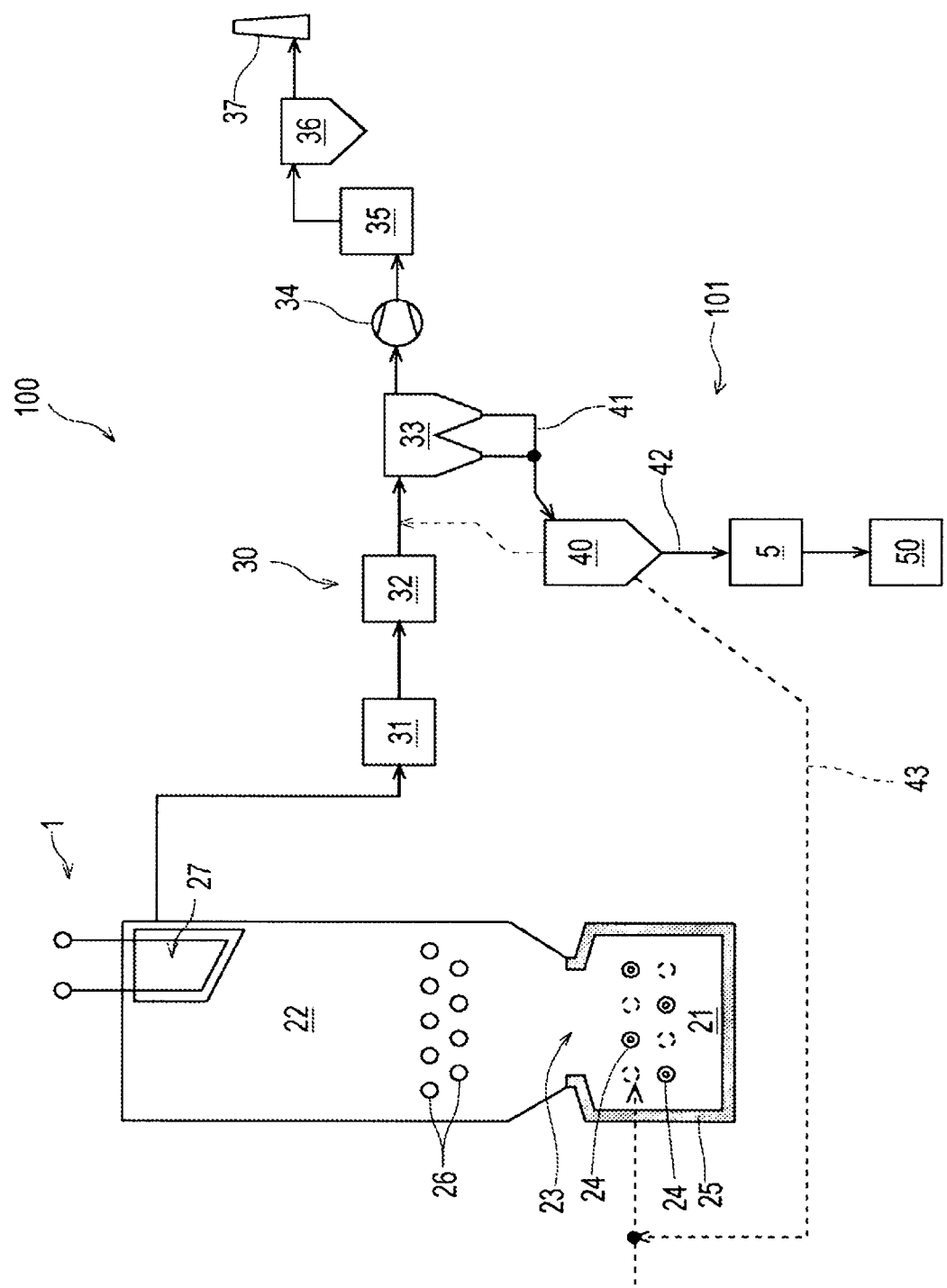
FIG. 1 schematically shows a system configuration of a boiler system according to one embodiment of the present invention.

FIG. 1 schematically shows a system configuration of the petroleum-based fuel combustion plant 100 according to the embodiment of the present invention. The petroleum-based fuel combustion plant 100 shown in FIG. 1 includes: the petroleum residue fired boiler 1 as a combustion furnace; and a waste gas treatment system 30, which treats waste gas from the petroleum residue fired boiler 1. The petroleum-based fuel combustion plant 100 further includes a combustion ash handling system 101, which handles combustion ash of the boiler 1, the combustion ash being recovered by the waste gas treatment system 30. The handling system 101 includes a metal separation extractor 50 and a separator 40. The metal separation extractor 50 recovers metals from the combustion ash. The separator 40 is a pretreatment device for the metal separation extractor 50.

[Petroleum Residue Fired Boiler 1]

The petroleum residue fired boiler 1 includes a combustion chamber that includes a high-temperature combustion zone 21 and a second-stage combustion zone 22. The high-temperature combustion zone 21, which is positioned at the lower part of the combustion chamber, is provided with burners 24 for combusting a petroleum residue fuel. In the high-temperature combustion zone 21, a fire-resisting material 25 is affixed to the entire inner surface of the furnace so as to withstand the internal furnace temperature, which is about 2000° C.

A restrictor 23 is formed at a combustion gas flow outlet that is positioned at the top of the high-temperature combustion zone 21. The restrictor 23 reduces the cross sectional area of a combustion gas passage from the high-temperature combustion zone 21 to the second-stage combustion zone 22 by 20 to 50% from the cross sectional area of a combustion gas passage in the high-temperature combustion zone 21. Similar to the high-temperature combustion zone 21, the fire-resisting material 25 is also affixed to a surface of the combustion gas inflow side of the restrictor 23, the surface facing the interior of the furnace. This makes it possible to prevent the internal temperature of the high-temperature combustion zone 21 from decreasing due to thermal transfer.

The second-stage combustion zone 22, which is a water-cooling wall structure, is formed above the restrictor 23. A steam superheater 27 is disposed at the upper part of the second-stage combustion zone 22. One or more second-stage combustion air nozzles 26 is/are disposed on the side wall of the second-stage combustion zone 22. The one or more second-stage combustion air nozzles 26 supply air for combusting uncombusted components contained in the combustion gas discharged from the high-temperature combustion zone 21.

In the above-described petroleum residue fired boiler 1, first, the petroleum residue fuel is fed to and combusted by the burners 24 such that the internal atmosphere of the high-temperature combustion zone 21 is maintained as a reducing atmosphere in which the excess air ratio is less than 1 (e.g., about 0.7). The entire inner surface of the high-temperature combustion zone 21, except the opening of the second-stage combustion zone 22, is covered by the fire-resisting material 25. Accordingly, the average internal temperature of the combustion chamber is kept to a high temperature of about 1500° C.

Under such condition, first, fuel NOx and thermal NOx are produced. The fuel NOx is produced from oxidation of N components in the fuel, and the thermal NOx is produced from oxidation of N components in the atmosphere. However, since the internal atmosphere of the high-temperature combustion zone 21 is a high-temperature reducing atmosphere, most of the fuel NOx and the thermal NOx are decomposed into $N_2$, and the rest thereof is partly present as an organic nitrogen compound such as $NH_3$ (ammonia) or HCN (cyanogen).

The $NH_3$ or HCN reacts with oxygen, and combustible components thereof are combusted. Consequently, fuel NOx is produced. However, since the oxygen concentration in the combustion chamber is kept low, the conversion ratio into the fuel NOx is kept low. Also, since the NOx thus produced is retained in the high-temperature reducing atmosphere, the NOx is thermally decomposed into nitrogen.

The combustion gas that flows out of the high-temperature combustion zone 21 flows into the second-stage combustion zone 22 through the restrictor 23. Combustion air is introduced into the second-stage combustion zone 22 from the second-stage combustion air nozzle(s) 26. In this manner, the internal atmosphere of the second-stage combustion zone 22 is maintained as an oxidizing atmosphere in which the excess air ratio is higher than or equal to 1 (e.g., about 1.1). The combustion gas that has flowed into the second-stage combustion zone 22 comes into contact with the combustion air fed from the second-stage combustion air nozzle(s) 26, and thereby combustion of uncombusted components in the gas is completed (i.e., perfect combustion). Then, the gas flows out of the combustion chamber into the waste gas treatment system 30 through the steam superheater 27.

Generally speaking, the amount of NOx production due to the combustion of the petroleum residue fuel significantly depends on the combustion temperature and the excess air ratio. That is, in a reducing atmosphere, the higher the combustion temperature, the less the amount of NOx production, whereas in an oxidizing atmosphere, the lower the combustion temperature, the less the amount of NOx production. In the petroleum residue fired boiler 1 according to the present embodiment, the production of fuel NOx is suppressed by combusting the fuel in the high-temperature reducing atmosphere of the high-temperature combustion zone 21, and the production of thermal NOx is suppressed by fully combusting the uncombusted components in the combustion gas in the low-temperature oxidizing atmosphere of the second-stage combustion zone 22. In the petroleum residue fired boiler 1 according to the present embodiment, the two-stage combustion technique as thus described is adopted, and thereby the amount of NOx production is reduced efficiently.

[Waste Gas Treatment System 30]

Combustion waste gas that flows into the waste gas treatment system 30 of the boiler 1 entrains combustion ash (fly ash). In the waste gas treatment system 30, the combustion waste gas is purified, and the fly ash entrained by the combustion waste gas is recovered. In the waste gas treatment system 30, a NOx removal catalyst 31, a gas air heater 32, a dry-type dust collector 33, an induced draft fan 34, a SOx removal catalyst 35, a wet-type dust collector 36, and a chimney 37 are arranged in this order from the upstream side to the downstream side of the flow of the combustion waste gas.

As a result of the induced draft fan 34 operating, the combustion waste gas flows from the boiler 1 into the waste gas treatment system 30. The combustion waste gas passes through the NOx removal catalyst 31, the gas air heater 32, the dry-type dust collector 33, the induced draft fan 34, the SOx removal catalyst 35, and the wet-type dust collector 36 sequentially, and is then released from the chimney 37 into the atmosphere. The NOx removal catalyst 31 removes NOx from the combustion waste gas. In the gas air heater 32, the combustion waste gas and, for example, the combustion air of the boiler 1 exchange heat with each other, and thus the combustion air is heated by utilizing the waste heat of the boiler 1. In the dry-type dust collector 33, the combustion ash entrained by the combustion waste gas is separated from the combustion waste gas. The combustion ash is fed to the separator 40 through a combustion ash transfer line 41. The SOx removal catalyst 35 removes SOx from the combustion waste gas. In the wet-type dust collector 36, dust that is smaller than the combustion ash entrained by the combustion waste gas is separated from the combustion waste gas.

[Separator 40]

The separator 40 is a dry-type separator that separates the combustion ash recovered from the combustion waste gas of the boiler 1 into a light component and a heavy component in a dry state. The light component of the combustion ash is fed from the separator 40 to the burners 24 through a light component transfer line 43, and is reused as part of the fuel in the boiler 1. The heavy component of the combustion ash is fed from the separator 40 to a recovery container 5 through a heavy component transfer line 42. After being recovered in the recovery container 5, the heavy component of the combustion ash is fed to the metal separation extractor 50. In the metal separation extractor 50, metals contained in the heavy component are separated and extracted from the heavy component.

As described above, part of the combustion ash (the light component) is combusted in the boiler 1 again. Accordingly, the combustion ash recovered by the dry-type dust collector 33 contains: combustion ash produced from the combustion of the petroleum residue fuel (hereinafter, referred to as "first-order combustion ash" for the sake of convenience of the description); and combustion ash produced from the combustion of the combustion ash (hereinafter, referred to as "high-order combustion ash" for the sake of convenience of the description). FIG. 2 illustrates the characteristics of the fuel and the combustion ash. FIG. 2 shows a cross-sectional image of each of the following: (a) a fuel particle of the petroleum residue fuel; (b) combustion ash (first-order combustion ash) produced from the combustion of the petroleum residue fuel; and (c) combustion ash (high-order combustion ash) produced from the combustion of the combustion ash. FIG. 2 further shows the density ratio and the particle diameter ratio of the high-order combustion ash (c) in a case where the first-order combustion ash (b) is used as a reference (=1).

The first-order combustion ash (b) produced from the combustion of the petroleum residue fuel contains a large amount of uncombusted carbon in addition to heavy metals (valuable metals) such as vanadium. The first-order combustion ash (b) has a hollow structure due to expansion of volatile components contained in the petroleum residue fuel. On the other hand, the high-order combustion ash (c) produced from the combustion of the combustion ash has a solid-core structure since the first-order combustion ash (b) from which the volatile components have been removed is heated and melted again. In the high-order combustion ash (c), the uncombusted carbon contained in the first-order combustion ash (b) is reduced due to the combustion thereof. Consequently, heavy metals therein are concentrated. The high-order combustion ash (c) is further combusted repeatedly in the boiler 1. Consequently, the uncombusted carbon contained therein is further reduced, and the concentration of heavy metals progresses.

The high-order combustion ash (c) has a higher density and a smaller particle diameter than the first-order combustion ash (b). In other words, the particles of the first-order combustion ash (b) are lighter and larger than the particles of the high-order combustion ash (c), and the particles of the high-order combustion ash (c) are heavier and smaller than the particles of the first-order combustion ash (b). For these reasons, the first-order combustion ash (b) and the high-order combustion ash (c) can be separated from each other by utilizing a specific gravity, or by utilizing a particle diameter.

In a case where the combustion ash recovered from the combustion waste gas of the boiler 1 is separated into the light component and the heavy component by utilizing a specific gravity, the amount of first-order combustion ash (b) contained in the light component is greater than the amount of high-order combustion ash (c) contained in the light component. Since the first-order combustion ash (b) contains a large amount of uncombusted carbon, the light component is useful as a fuel of the boiler 1. On the other hand, the amount of high-order combustion ash (c) contained in the heavy component is greater than the amount of first-order combustion ash (b) contained in the heavy component. In the high-order combustion ash (c), heavy metals such as vanadium are concentrated, and also, the high-order combustion ash (c) has a low bulkiness. Therefore, by feeding the heavy component to the metal separation extractor 50, metals can be efficiently recovered from the combustion ash.

Figure 3:
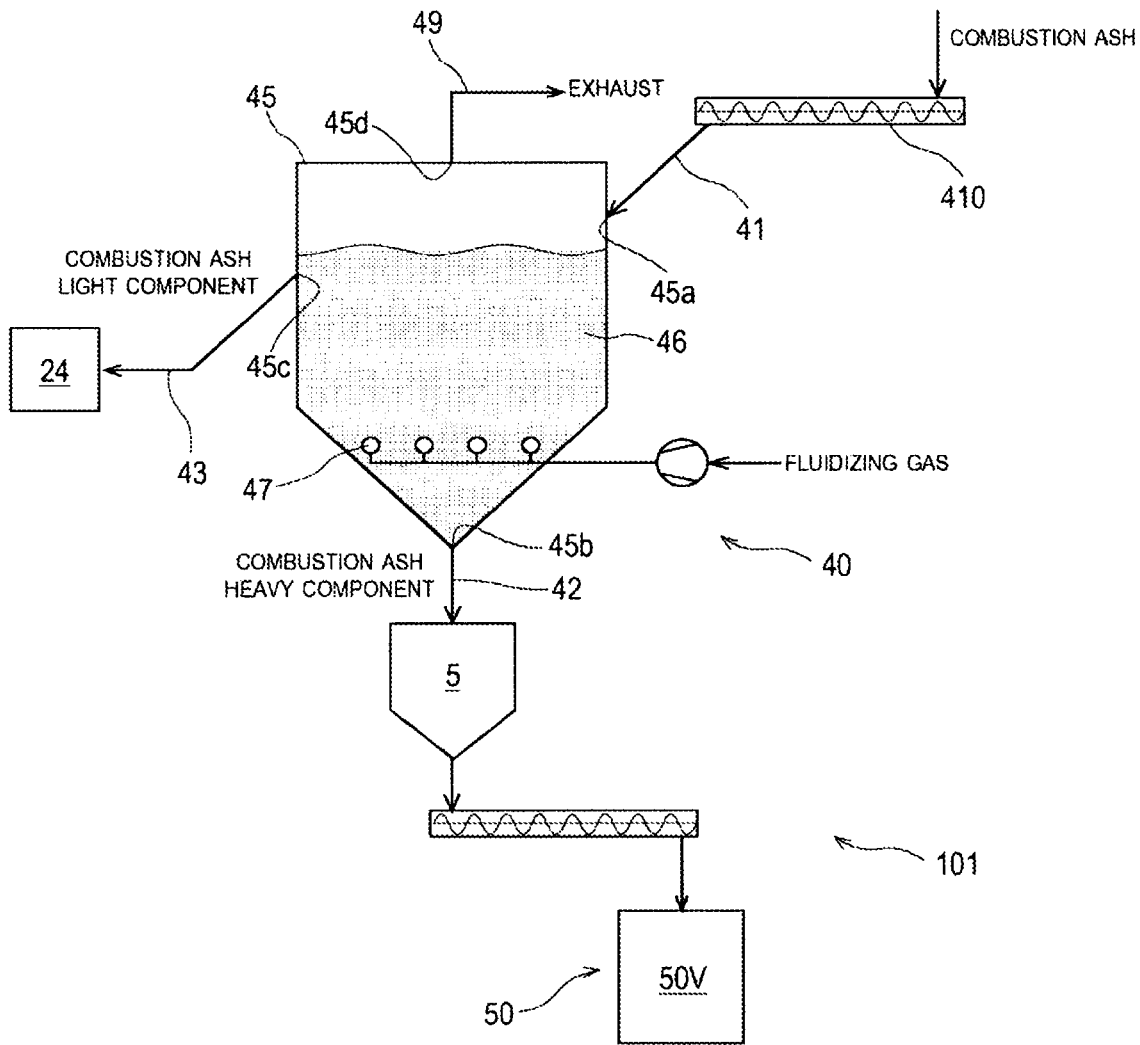
FIG. 3 shows a schematic configuration of a separator.

The separator 40 according to the present embodiment is a dry-type specific gravity separator that adopts a dry-type specific gravity separation technique using a fluidized bed 46. FIG. 3 shows a schematic configuration of the separator 40. The separator 40 shown in FIG. 3 includes a separation container 45 and diffuser tubes 47. The diffuser tubes 47 feed fluidizing gas to the bottom of the inside of the separation container 45. The fluidizing gas is, for example, nitrogen gas.

The upper part of the separation container 45 is provided with a combustion ash feeding port 45a. The dry-type dust collector 33 is connected to the combustion ash feeding port 45a via the combustion ash transfer line 41. Accordingly, the combustion ash recovered by the dry-type dust collector 33 is fed into the separation container 45 through the combustion ash feeding port 45a. For the purpose of feeding the combustion ash quantitatively, the combustion ash transfer line 41 may be provided with a quantitative feeder 410.

The combustion ash fed to the separation container 45 accumulates in the separation container 45, and forms a combustion ash layer therein. The fluidizing gas is injected from the diffuser tubes 47 into the lower portion of the combustion ash layer, and causes the combustion ash layer to be suspended and fluidized. At the time, the fluidized bed 46, which is made of the combustion ash, behaves in the same manner as a liquid. In the fluidized bed 46 made of the combustion ash, the light component in the combustion ash floats, whereas the heavy component in the combustion ash sinks. Here, the combustion ash is a fluidized medium that is subjected to specific gravity separation. The superficial velocity of the fluidizing gas is suitably set through an experiment or simulation so that the light component and the heavy component in the combustion ash can be separated from each other by sink float separation.

As described above, the light component and the heavy component in the combustion ash are separated from each other by sink float separation, and are discharged through different outlets, respectively. The bottom of the separation container 45 is provided with a heavy component outlet 45b. The heavy component outlet 45b is connected to the recovery container 5 via the heavy component transfer line 42. The heavy component discharged through the heavy component outlet 45b is fed to the recovery container 5 through the heavy component transfer line 42, and recovered in the recovery container 5.

The lower part of the separation container 45 is provided with a light component outlet 45c, which is positioned above the heavy component outlet 45b. The light component outlet 45c is connected to the burners 24 of the boiler 1 via the light component transfer line 43. The light component discharged through the light component outlet 45c is fed to the burners 24 through the light component transfer line 43, and is injected into the high-temperature reducing combustion chamber 2 from the burners 24 together with the petroleum residue fuel.

The top of the separation container 45 is provided with an exhaust outlet 45d. Since the separation container 45 contains powder dust, the exhaust outlet 45d may be connected to the inlet of the dry-type dust collector 33 through an exhaust line 49 (see FIG. 1).

[Metal Separation Extractor 50]

The metal separation extractor 50 according to the present embodiment includes a vanadium separation extraction treatment tank 50V, and separates and extracts vanadium from the combustion ash. Alternatively, the metal separation extractor 50 may separate and extract not only vanadium but also other valuable metals such as nickel. After being recovered in the recovery container 5, the heavy component of the combustion ash is fed to the vanadium separation extraction treatment tank 50V. The combustion ash may be transferred from the recovery container 5 to the vanadium separation extraction treatment tank 50V by a conveyance means such as a conveyor, or by a transportation means such as an automobile or a ship. In a case where the separator 40 and the metal separation extractor 50 are adjacent to each other, the recovery container 5 may be eliminated, and the treatment tank included in the metal separation extractor 50 may serve as a recovery container.

Figure 4:
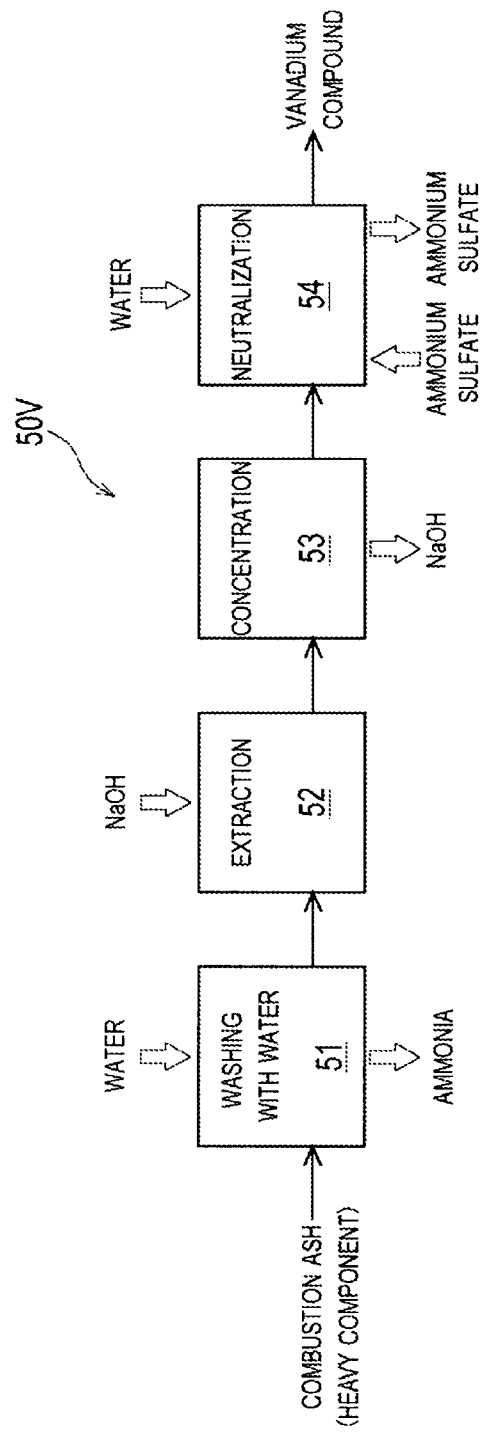
FIG. 4 is a block diagram showing a flow of a vanadium separation extraction treatment.

There are various vanadium separation extraction methods that have been known. The vanadium separation extraction treatment tank 50V according to the present embodiment adopts an alkali process. FIG. 4 is a block diagram showing a flow of a vanadium separation extraction treatment.

As shown in FIG. 4, in the vanadium separation extraction treatment tank 50V, the combustion ash goes through a water washing process 51, an alkali extraction process 52, a concentration process 53, and a neutralization process 54, and as a result, a vanadium compound is obtained. In the water washing process 51, the combustion ash (the heavy component) separated by the separator 40 is washed by water. In this process, water-soluble ammonium sulfate is eluted into water, and thereby the ammonium sulfate is separated from the combustion ash. In the alkali extraction process 52, the combustion ash is suspended in an alkali solution such as sodium hydroxide. Consequently, vanadium is eluted into the alkali solution, and thereby a vanadium eluate is obtained. In the concentration process 53, the vanadium eluate is concentrated, and thereby a solid component is crystallized. In the neutralization process 54, dilute sulfuric acid such as ammonium sulfate and water are added to the solid component separated from the eluate to neutralize the solid component, and thereby an aqueous solution in which the solid component is dissolved is obtained. Then, a vanadium compound is separated and recovered from the aqueous solution by crystallization. The vanadium compound recovered in this manner can be utilized, for example, as a battery electrolyte solution.

As described above, the combustion ash handling method according to the present embodiment is a method of handling combustion ash discharged from the boiler 1 (corresponding to the "combustion furnace" in the claims), which combusts a petroleum residue fuel. The method includes: separating the combustion ash into a heavy component and a light component by a dry-type separation technique; feeding the light component to the boiler 1 as a fuel; and recovering the heavy component. The combustion ash handling method according to the present embodiment further includes separating and extracting vanadium from the heavy component that has been recovered.

The combustion ash handling system 101 according to the present embodiment is a system of handling combustion ash discharged from the boiler 1, which combusts a petroleum residue fuel. The system 101 includes: the dry-type separator 40, which separates the combustion ash into a heavy component and a light component; the light component transfer line 43, which feeds the light component to the boiler 1 as a fuel; and the recovery container 5 (or the treatment tank of the metal separation extractor 50), which recovers the heavy component. The combustion ash handling system 101 according to the present embodiment further includes the metal separation extractor 50, which separates and extracts vanadium from the heavy component that has been recovered in the recovery container 5.

The petroleum-based fuel combustion plant 100 according to the embodiment includes: the boiler 1, which combusts a petroleum residue fuel; the dry-type dust collector 33, which recovers combustion ash discharged from the boiler 1; and the combustion ash handling system 101, which handles the combustion ash.

In the above-described combustion ash handling method and combustion ash handling system 101, part of the combustion ash discharged from the boiler 1 is returned to the boiler 1 and used as a fuel. Accordingly, the combustion ash discharged from the boiler 1 contains combustion ash produced from the combustion of the fuel (i.e., the first-order combustion ash (b)) and combustion ash produced from the combustion of the combustion ash (i.e., the high-order combustion ash (c)). The first-order combustion ash (b) contains a large amount of uncombusted carbon. Therefore, the first-order combustion ash (b) has a low specific gravity. On the other hand, the high-order combustion ash (c) contains less uncombusted carbon than the first-order combustion ash (b), and heavy metals such as vanadium are concentrated in the high-order combustion ash (c). Therefore, the high-order combustion ash (c) has a high specific gravity. Accordingly, in a case where the combustion ash is separated into a heavy component and a light component by dry-type specific gravity separation, the heavy component contains a large amount of high-order combustion ash (c), and the light component contains a large amount of first-order combustion ash (b).

The light component of the combustion ash contains a large amount of uncombusted carbon, and is suitable to be used as a fuel in the boiler 1, which makes it possible to efficiently utilize the energy of the combustion ash. In addition, since the light component of the combustion ash is separated by dry-type separation, the light component of the combustion ash can be directly utilized as a fuel in the boiler 1 as it is.

The volume of the heavy component of the combustion ash is less than the volume of the combustion ash discharged from the boiler 1. Since the heavy component of the combustion ash has such a reduced volume, the recovery container 5, which recovers the heavy component, can be reduced in size. This makes it possible to reduce the space for storing the heavy component of the combustion ash, and thereby the storage efficiency can be increased. Moreover, space and energy for transferring the heavy component of the combustion ash can be reduced, and thereby the transferring efficiency can be increased. The heavy component of the combustion ash, which has such a reduced volume, is subjected to the subsequent process, in which the metal separation and extraction treatment is performed on the heavy component. Therefore, the scale of the equipment (the metal separation extractor 50) used in the metal separation and extraction process can be reduced. The amount of uncombusted carbon contained in the heavy component of the combustion ash is less than the amount of uncombusted carbon contained in the combustion ash discharged from the boiler 1, and heavy metals such as vanadium are concentrated in the heavy component of the combustion ash. Therefore, high metal recovery efficiency can be realized in the metal separation extraction treatment.

As described in the present embodiment, in the combustion ash handling method, the combustion ash may be separated into the heavy component and the light component by specific gravity separation. In this case, the combustion ash may be separated into the heavy component and the light component by sink float separation with use of the fluidized bed 46. Similarly, in the above-described combustion ash handling system 101, the dry-type separator 40 may include the fluidized bed 46, in which the light component and the heavy component in the combustion ash are separated from each other by sink float separation.

As described above, for the separation of the combustion ash, the fluidized bed 46 is used, by which the heavy component and the light component can be separated from each other by specific gravity separation. This makes it possible to assuredly separate the light component and the heavy component from each other while keeping the introduction cost and operating cost of the equipment relatively low. In addition, the proportion of the high-order combustion ash (c) contained in the heavy component of the combustion ash, and the proportion of the first-order combustion ash (b) contained in the light component of the combustion ash, can be readily adjusted by changing the superficial velocity. In other words, by changing the superficial velocity, the proportion of the high-order combustion ash (c) contained in the heavy component can be adjusted to a desired value. Therefore, higher metal recovery efficiency can be realized in the metal (e.g., vanadium) separation extraction treatment.

In the above-described combustion ash handling method and combustion ash handling system 101, the fluidized medium of the fluidized bed 46 may be the combustion ash.

Accordingly, the heavy component and the light component, which are separated from each other in the fluidized bed 46, are both combustion ash. Generally speaking, silica sand or the like is used as a fluidized medium. However, silica sand or the like is not contained in the fluidized medium of the fluidized bed 46. Therefore, the light component of the combustion ash, which is separated in the fluidized bed 46, need not be subjected to a separation process or the like, but can be directly used as a fuel of the boiler 1 as it is. Similarly, the heavy component of the combustion ash, which is separated in the fluidized bed 46, need not be subjected to a separation process or the like, but can be directly fed to the metal separation extractor 50 as it is. In addition, since the fluidized bed 46 of the separator 40 is made solely of the combustion ash, the maintenance of the separator 40 is easy.

Although the preferred embodiment of the present invention is as described above, specific structural and/or functional details of the above-described embodiment can be modified without departing from the spirit of the present invention, and such modifications would fall within the scope of the present invention. The above-described configurations can be modified, for example, as described below.

As one example, although in the above-described embodiment the combustion furnace that discharges the combustion ash is the petroleum residue fired boiler 1, the combustion furnace is not thus limited. The combustion furnace may be any combustion furnace that combusts at least one of the following petroleum-based fuels: fuel oil; heavy oil; and a petroleum residue.

As another example, although in the above-described embodiment the separator 40 adopts a dry-type specific gravity separation technique using the fluidized bed 46, the separator 40 is not thus limited. Alternatively, for example, a dry-type cyclone specific gravity separator that separates the heavy component and the light component from each other by specific gravity separation, or a sieve that separates the heavy component and the light component from each other by utilizing a particle diameter, may be adopted. For example, in the case of adopting a sieve as the separator 40, the combustion ash that remains on the sieve is the light component, and the combustion ash that falls through the sieve is the heavy component.

As yet another example, although in the above-described embodiment the vanadium separation extraction treatment tank 50V adopts an alkali process, the vanadium separation extraction treatment tank 50V is not thus limited. Alternatively, in accordance with the use application of vanadium, the vanadium separation extraction treatment tank 50V may be any tank that realizes a known vanadium recovery method.

The invention claimed is:

1. A combustion ash handling method of handling combustion ash discharged from a combustion furnace that combusts a petroleum-based fuel, the combustion ash handling method comprising:

separating the combustion ash into a heavy component and a light component by a dry-type separation technique;

feeding the light component to the combustion furnace as a fuel; and recovering the heavy component.

2. The combustion ash handling method according to claim 1, wherein separating the combustion ash includes separating the combustion ash into the heavy component and the light component by dry-type specific gravity separation.

3. The combustion ash handling method according to claim 1, wherein separating the combustion ash includes separating the combustion ash into the heavy component and the light component by sink float separation with use of a fluidized bed.

4. The combustion ash handling method according to claim 3, wherein a fluidized medium of the fluidized bed is the combustion ash.

5. The combustion ash handling method according to claim 1, further comprising separating and extracting a metal from the heavy component that has been recovered, the metal containing at least vanadium.

6. A combustion ash handling system for handling combustion ash discharged from a combustion furnace that combusts a petroleum-based fuel, the combustion ash handling system comprising:

a dry-type separator that separates the combustion ash into a heavy component and a light component;

a light component transfer line that feeds the light component to the combustion furnace as a fuel; and a recovery container that recovers the heavy component.

7. The combustion ash handling system according to claim 6, wherein the dry-type separator separates the combustion ash into the heavy component and the light component by specific gravity separation.

8. The combustion ash handling system according to claim 6, wherein the dry-type separator includes a fluidized bed in which the light component and the heavy component in the combustion ash are separated from each other by sink float separation.

9. The combustion ash handling system according to claim 8, wherein a fluidized medium of the fluidized bed is the combustion ash.

10. The combustion ash handling system according to claim 6, further comprising:

a metal separation extractor that separates and extracts vanadium from the heavy component that has been recovered in the recovery container.

11. A petroleum-based fuel combustion plant comprising:

a combustion furnace that combusts a petroleum-based fuel;

a dry-type dust collector that recovers combustion ash discharged from the combustion furnace; and the combustion ash handling system according to claim 6, which handles the combustion ash.

* * * * *